US009321878B2

(12) United States Patent
Huang et al.

(10) Patent No.: US 9,321,878 B2
(45) Date of Patent: Apr. 26, 2016

(54) PROCESS FOR THE PREPARATION OF SILYLATED POLYURETHANE POLYMERS USING TITANIUM-CONTAINING AND ZIRCONIUM-CONTAINING CATALYSTS

(71) Applicants: Misty Huang, New City, NY (US); Vikram Kumar, Tarrytown, NY (US); Thomas Lim, Killingworth, CT (US); Constantine Kondos, White Plains, NY (US); Brendan O'Keefe, Parkersburgh, WV (US)

(72) Inventors: Misty Huang, New City, NY (US); Vikram Kumar, Tarrytown, NY (US); Thomas Lim, Killingworth, CT (US); Constantine Kondos, White Plains, NY (US); Brendan O'Keefe, Parkersburgh, WV (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 14/107,606

(22) Filed: Dec. 16, 2013

(65) Prior Publication Data

US 2015/0166719 A1    Jun. 18, 2015

(51) Int. Cl.
| | |
|---|---|
| *C08G 18/83* | (2006.01) |
| *C08G 18/71* | (2006.01) |
| *C08G 18/75* | (2006.01) |
| *C09J 175/04* | (2006.01) |
| *C09D 175/04* | (2006.01) |
| *C08G 18/32* | (2006.01) |
| *C08G 18/22* | (2006.01) |
| *C08K 5/52* | (2006.01) |
| *C08G 18/48* | (2006.01) |
| *C08G 18/10* | (2006.01) |
| *C08G 18/16* | (2006.01) |
| *C09J 175/08* | (2006.01) |

(52) U.S. Cl.
CPC .............. *C08G 18/718* (2013.01); *C08G 18/10* (2013.01); *C08G 18/163* (2013.01); *C08G 18/222* (2013.01); *C08G 18/3206* (2013.01); *C08G 18/4825* (2013.01); *C08G 18/755* (2013.01); *C08G 18/757* (2013.01); *C08K 5/52* (2013.01); *C09D 175/04* (2013.01); *C09J 175/04* (2013.01); *C09J 175/08* (2013.01)

(58) Field of Classification Search
None
See application file for complete search history.

(56) References Cited

U.S. PATENT DOCUMENTS

| | | | | |
|---|---|---|---|---|
| 4,361,692 | A * | 11/1982 | Ammons | 528/51 |
| 4,391,937 | A * | 7/1983 | Falender | C08K 5/00 |
| | | | | 502/170 |
| 5,922,828 | A * | 7/1999 | Schiraldi | C08G 63/82 |
| | | | | 524/115 |
| 6,197,912 | B1 | 3/2001 | Huang et al. | |
| 6,395,861 | B1 * | 5/2002 | Kennedy, III | 528/80 |
| 7,319,128 | B2 | 1/2008 | Ziche et al. | |
| 7,405,259 | B2 | 7/2008 | Frye et al. | |
| 7,417,105 | B2 * | 8/2008 | Landon et al. | 528/34 |
| 7,435,787 | B2 | 10/2008 | Banevicius et al. | |
| 7,569,645 | B2 | 8/2009 | Lin et al. | |
| 7,732,554 | B2 | 6/2010 | O'Keefe et al. | |
| 7,781,513 | B2 | 8/2010 | Lucas et al. | |
| 8,232,362 | B2 | 7/2012 | Yang et al. | |
| 8,378,037 | B2 | 2/2013 | Griswold | |
| 8,609,800 | B2 * | 12/2013 | Boudet et al. | 528/28 |
| 2004/0147706 | A1 * | 7/2004 | Stengel | 528/56 |
| 2007/0060732 | A1 * | 3/2007 | Yang et al. | 528/44 |
| 2007/0100108 | A1 * | 5/2007 | Huang et al. | 528/29 |
| 2009/0099660 | A1 * | 4/2009 | Scifert et al. | 623/17.16 |
| 2010/0020438 | A1 | 1/2010 | Gross et al. | |
| 2010/0249357 | A1 | 9/2010 | Popa et al. | |

FOREIGN PATENT DOCUMENTS

| | | |
|---|---|---|
| CN | 102492389 | 6/2012 |
| CN | 102911335 | 2/2013 |
| DE | 103 48 555 A1 | 5/2005 |
| DE | 10 2008 021221 A1 | 10/2009 |
| EP | 0676403 | 10/1995 |
| JP | 63-172712 * | 7/1988 |
| JP | 2000128948 | 5/2000 |
| WO | 9211328 | 7/1992 |
| WO | 2009104161 | 8/2009 |

OTHER PUBLICATIONS

Abstract for DE 103 48 555 (May 2005).*
Abstract for JP 63-172712 (Jul. 1988).*
Partial translation of JP 63-172712 (no date).*
Machine translation of JP 7-96587 (no date).*
International Search Report for PCT/US2014/070315 dated Mar. 11, 2015.

* cited by examiner

*Primary Examiner* — Mark Zimmer
(74) *Attorney, Agent, or Firm* — James C. Abruzzo

(57) ABSTRACT

The present invention relates to a process for preparing silylated polyurethane polymers which have increased stability under ambient condition or storage toward atmospheric moisture, in the presence of at least one of titanium-containing catalyst or zirconium-containing catalyst and to silylated polyurethane polymer compositions comprising these catalysts.

18 Claims, 1 Drawing Sheet

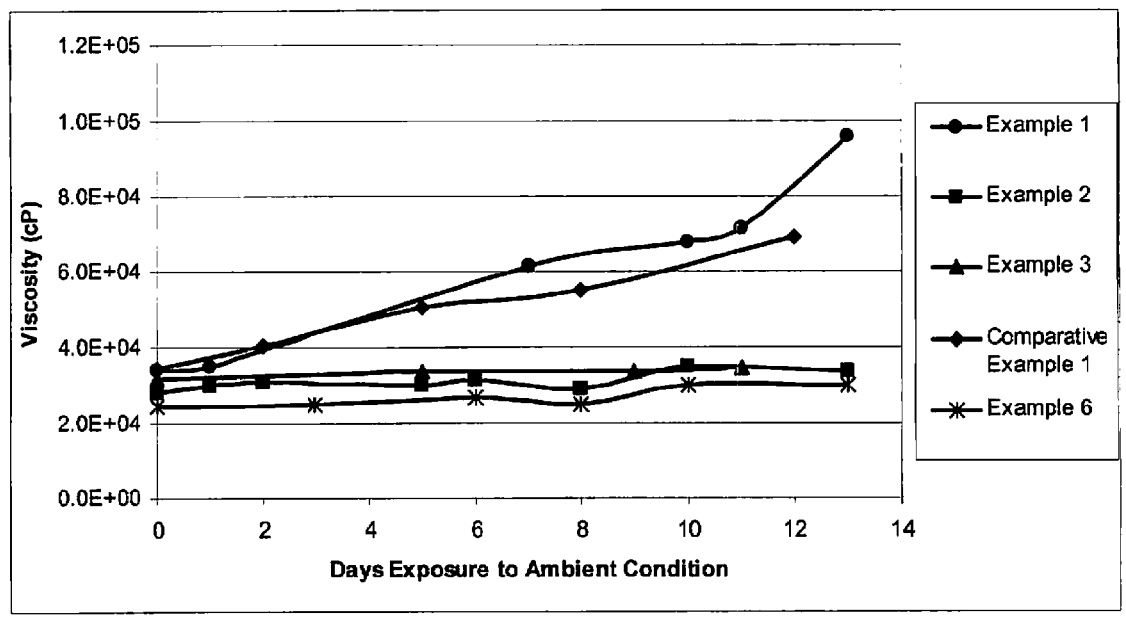
Viscosity of the Silylated Polyurethane Composition Exposure to Atmospheric Moisture at 23°C and 1 Atmosphere Pressure.

PROCESS FOR THE PREPARATION OF SILYLATED POLYURETHANE POLYMERS USING TITANIUM-CONTAINING AND ZIRCONIUM-CONTAINING CATALYSTS

BACKGROUND OF THE INVENTION

1. Field of the Invention

The present invention relates to silyl-functionalized polymers exhibiting increased stability toward atmospheric moisture. More particularly, this invention is related to a process for the preparation of silylated polyurethane polymers which avoids the use of tin catalysts in favor of alternative reduced toxicity catalysts.

2. Description of Related Art

Moisture-curable formulations are well known, particularly those which are based on silyl-functionalized polymers. The silyl-functionalized polymers may be prepared by a number of methods. One example is the reaction of polymers having end groups containing active hydrogen with isocyanates, particularly isocyanatoalkylalkoxysilanes. Another example is the reaction of isocyanate-terminated polyurethane polymers with aminosilanes or mercaptosilanes. The reaction is often carried out with urethane reaction-forming catalysts, i.e., catalysts that promote the isocyanate reaction with active hydrogen-containing compounds.

Known urethane reaction-forming catalysts include, for example, dialkyltin compounds, metal complexes (chelates and carboxylates) of bismuth and zinc and tertiary amine compounds.

A disadvantage of many known urethane reaction-forming catalysts for preparing silane-crosslinkable polyurethane polymers is that these polymers need to be handled under conditions which exclude moisture. In industrial practice this is associated with a high degree of complexity thus adding to the cost of manufacture.

Moreover, environmental regulatory agencies and directives have increased, or are expected to increase, restrictions on the use of tin-containing compounds in formulated products. For example, while formulations with greater than 0.5 weight percent dibutyltin presently require labeling as toxic with reproductive 1B classification, dibutyltin-containing formulations are proposed to be completely phased out in consumer applications over the next 4-6 years.

Accordingly, it is an object of the present invention to provide a process for the preparation of silylated polyurethane polymers employing non-tin urethane reaction-forming catalysts.

SUMMARY OF THE INVENTION

In accordance with one aspect of the invention, there is provided a process for the preparation of silylated polyurethane polymer (i) from the reaction of polyol (ii) and/or hydroxyl-terminated polyurethane (iii) with isocyanatosilane silylating agent (iv), or the reaction of isocyanate-terminated polyurethane (v) with amino-functional silane silylating agent (vi) and/or mercapto-functional silane silylating agent (vii), the process comprising employing at least one urethane-forming reaction catalyst (viii) for the preparation of hydroxyl-terminated polyurethane (iii), isocyanate-terminated polyurethane (v) and/or silylated polyurethane polymer (i), urethane-forming reaction catalyst (viii) being selected from the group consisting of titanium-containing catalyst and zirconium-containing catalyst.

The present invention provides essentially tin-free silylated polyurethane polymers having enhanced stability under ambient conditions or in storage where moisture may be present. The silylated polyurethane polymers can be cured with additional curing catalysts and under ambient condition to form sealants, coatings, adhesives, gaskets, and the like. This characteristic of silylated polyurethane polymers can significantly benefit the manufacturing processes.

BRIEF DESCRIPTION OF DRAWING

FIG. 1 shows the viscosity over time of silylated polyurethane polymers exposed to 50 percent relative humidity and one atmosphere pressure and 23° C.

DETAILED DESCRIPTION OF PREFERRED EMBODIMENTS

In the specification and claims herein, the following terms and expressions are to be understood as indicated herein below.

It will also be understood that any numerical range recited herein is intended to include all sub-ranges within that range and any combination of end points of said ranges or sub-ranges.

As used herein, the term "monovalent" in reference to a group means that the group is capable of forming one covalent bond per group. As used herein, the term "polyvalent" in reference to a group means that the group is capable of forming two or more covalent bonds per group.

As used herein, the term "hydrocarbon group" is a group consisting of carbon and hydrogen atoms and includes acyclic hydrocarbon groups, alicyclic hydrocarbon groups and aromatic hydrocarbon groups.

As used herein, the term "acyclic hydrocarbon group" means any straight chain or branched hydrocarbon group, preferably containing from 1 to 60 carbon atoms, which may be saturated or unsaturated. Suitable monovalent acyclic hydrocarbon groups include alkyl, alkenyl and alkynyl groups. Representative and non-limiting examples of monovalent acyclic hydrocarbon groups are methyl, ethyl, sec-butyl, tert-butyl, octyl, decyl, dodecyl, cetyl, stearyl, ethenyl, propenyl, and butynyl. Suitable divalent acyclic hydrocarbon groups include linear or branched alkylene groups. Representative and non-limiting examples of divalent acyclic hydrocarbon groups are methylene, ethylene, propylene, hexylene, methylethylene, 2-methylpropylene and 2,2-dimethylpropylene. Suitable trivalent acyclic hydrocarbon radicals include alkanetriyl radicals, such as, for example, 1,1,2-ethanetriyl, 1,2,4-butanetriyl, 1,2,8-octanetriyl and 1,2,4-hexanetriyl.

As used herein the term "alkyl" means any saturated straight or branched monovalent hydrocarbon group. In a preferred embodiment, monovalent alkyl groups are selected from linear or branched alkyl groups containing from 1 to 60 carbons per group, such as, for example, methyl, ethyl, propyl, iso-propyl, n-butyl, iso-butyl, sec-butyl, tert-butyl, pentyl, hexyl, heptyl, decyl and dodecyl.

As used herein the term "alkenyl" means any straight or branched monovalent hydrocarbon group containing at least one carbon-carbon double bond and preferably containing from 2 to 10 carbon atoms, such as, for example, ethenyl, 2-propenyl, 3-butenyl, 5-hexenyl and 7-octenyl.

As used herein, the term "alicyclic hydrocarbon group" means a group containing one or more hydrocarbon rings, preferably containing from 3 to 12 carbon atoms, which may optionally be substituted on one or more of the rings with one or more monovalent or divalent acyclic group containing preferably 1 to 6 carbon atoms. In the case of an alicyclic hydrocarbon group containing two or more rings, the rings may be fused rings in which the two rings share two or more carbon atoms in common, or rings that are bonded to each other through a covalent bond or divalent acyclic group. Suitable monovalent alicyclic hydrocarbon groups include, for example, cycloalkyl groups, such as cyclohexyl and cyclooctyl or cycloalkenyl groups, such as cyclohexenyl. Suitable divalent hydrocarbon groups include, saturated or unsaturated divalent monocyclic hydrocarbon radicals, such as, for example, 1,4-cyclohexylene. Suitable trivalent alicyclic hydrocarbon radicals include cycloalkanetriyl radicals such as, for example, 1-ethylene-2,4-cyclohexylene and 1-methylethylene-3-methyl-3,4-cyclohexylene.

As used herein, the term "aromatic hydrocarbon group" means a hydrocarbon group containing one or more aromatic rings, which may, optionally, be substituted on the aromatic rings with one or more monovalent or divalent acyclic groups preferably containing 1 to 6 carbon atoms. In the case of an aromatic hydrocarbon group containing two or more rings, the rings may be fused rings in which the rings share two or more carbon atoms in common, or rings that are bonded to each other through a covalent bond or divalent acyclic group. Suitable monovalent aromatic hydrocarbon include, for example, phenyl, tolyl, 2,4,6-trimethylphenyl, naphthyl and anthryl, as well as aralkyl groups, such as, for example, 2-phenylethyl. Suitable divalent aromatic hydrocarbon groups include divalent monocyclic arene groups such as, for example, 1,2-phenylene, 1,4-phenylene, 4-methyl-1,2-phenylene and phenylmethylene. Suitable trivalent aromatic hydrocarbon groups include, for example, 1,3,5-phenylene and 1,2,4-phenylene.

The expression "essentially tin-free" as applied to silylated polyurethane polymer (i), silylated polyurethane polymer composition and cured silylated polyurethane polymer obtained therefrom shall be understood to mean less than 1 ppm tin based on the weight of silylated polyurethane polymer (i).

In accordance with one aspect of the invention, there is provided a process for the preparation of silylated polyurethane polymer (i) from the reaction of polyol (ii) and/or hydroxyl-terminated polyurethane (iii) with isocyanatosilane silylating agent (iv), or the reaction of isocyanate-terminated polyurethane (v) with amino-functional silane silylating agent (vi) and/or mercapto-functional silane silylating agent (vii), the process comprising employing at least one urethane-forming reaction catalyst (viii) for the preparation of hydroxyl-terminated polyurethane (iii), isocyanate-terminated polyurethane (v) and/or silylated polyurethane polymer (i), urethane-forming reaction catalyst (viii) being selected from the group consisting of titanium-containing catalyst and zirconium-containing catalyst.

(a) Polyol (ii)

It will be understood herein that any known or commercially used polyols or mixture of polyols and/or chain extenders can be employed herein. Polyols (ii) can have a functionality up to 8 but advantageously have a functionality of from 1.5 to 3, and more advantageously, a functionality of 1.85 to 2.

In particular, polyols (ii) used in the present invention are polyether polyols, polyester polyols, hydroxyl-terminated polybutadienes and hydroxyl-terminated polyurethanes. Specific suitable polyols include poly(oxyalkylene)ether diols (i.e., polyether diols), in particular, poly(oxyethylene)ether diols, poly(oxypropylene)ether diols and poly(oxyethylene-oxypropylene)ether diols, poly(oxyalkylene)ether triols (i.e., polyether triols), in particular, poly(oxyethylene)ether triols, poly(oxypropylene)ether triols and poly(oxyethylene-oxypropylene)ether triols, poly(tetramethylene)ether glycols, polyacetals, polyhydroxy polyacrylates, polyhydroxy polyester amides, polyhydroxy polythioethers, polycaprolactone diols and triols, polybutadiene diols, and the like.

Advantageously, the polyether polyols employed in the present invention have a very low unsaturation level and therefore the ends of the polymer contain mostly hydroxyl groups. Polyether polyols of this type are generally prepared using metal complex catalysts for the polymerization of alkylene oxide resulting in polyols having a low level of terminal ethylenic unsaturation, e.g., less than 0.2, preferably less than 0.02 and more preferably less than 0.008, milliequivalents per gram of polyol. Especially suitable are the polyether polyols prepared in the presence of double-metal cyanide (DMC) catalysts. Polyether polyols produced in the presence of such catalysts tend to have high molecular weights and low levels of unsaturation, properties which are believed to account for the improved performance of polymers derived therefrom. The polyether polyols preferably have a number average molecular weight of from 1,000 grams per mole to 25,000 grams per mole, more preferably from 2,000 grams per mole to 20,000 grams per mole and more preferably still from 4,000 grams per mole to 18,000 grams per mole. The levels of terminal ethylenic unsaturation are generally less than 0.2, preferably less than 0.02, and more preferably less than 0.008 milliequivalents per gram (meq/g) of polyol.

In one embodiment of the invention, the polyether polyols used in the production of silylated polyurethane polymer (i) are poly(oxyethylene) diols with number average molecular weights (Mn) between 500 grams per mole and 25,000 grams per mole and a level of unsaturation of less than 0.02 milliequivalents per gram of polyol. In another embodiment of the invention, the polyether polyols used in the production of silylated polyurethane polymer (i) are poly(oxypropylene) diols, also known as polypropylene glycol, with number average molecular weights between 1,000 grams per mole and 20,000 grams per mole, and more particularly, number average molecular weight of from 7,000 to 18,000 grams per mole, and even more particularly from 10,000 to 14,000 grams per mole and levels of unsaturation of less than 0.02 milliequivalents per gram polyol, more particularly less than 0.008 milliequivalent per gram polyol. The preferred functionality of the polypropylene glycol is from 1.85 to 2.0.

Examples of polyester polyol include: adipate-based polyester polyols, such as polyester polyol obtained from the reaction of ethylene glycol and adipic acid, and polyester polyol obtained from the reaction of 1,4-butylene glycol and adipic acid; and polycaprolactone-based polyester polyol obtained by using ε-caprolactone.

The number average molecular weights (Mn) are determined from the hydroxyl number of the polyols, using the equation:

$$Mn = \frac{[(\text{functionality of the polypol})(56{,}010 \text{ milligrams } KOH/\text{mole})]}{[\text{hydroxyl number in millgrams of } KOH/\text{gram of polyol}]} n$$

where the hydroxyl number of the polyol, reported in units of milligrams of KOH/gram of polyol, is determined in accordance with ASTM D4274-11, Standard Test Methods for Testing Polyurethane Raw Materials: Determination of Hydroxyl Numbers of Polyols.

Mixtures of polyols of various structures, molecular weights and/or functionalities can also be used. Examples of commercially available polyols that are suitable for making silylated polyurethane polymer (i) herein include, but are not limited to, polyether polyol ARCOL® R-1819 (number average molecular weight of 8,000 grams per mole, available from Bayer Material Science), polyether polyol ARCOL® E-2204 (number average molecular weight of 4,000 grams per mole) and polyether polyol ARCOL® E-2211 (number average molecular weight of 11,000 grams per mole, available from Bayer Material Science).

Polyol (ii) can also be prepared from a reaction mixture containing one or more chain extenders and/or one or more other polyols. Examples of suitable chain extenders are polyhydric alcohols such as ethylene glycol, propylene glycol, propane-1,3-diol, butane-1,4-diol, hexane-1,6-diol, diethylene glycol, triethylene glycol, tetraethylene glycol, dipropylene glycol, triethylene glycol, tetrathylene glycol, dipropylene glycol, tripropylene glycol, tetrapropylene glycol and the like. Additional polyols can be chosen from polyols described above and include polyether polyols, polyester polyols, polyetherester polyols, polyesterether polyols, polybutadienediols, polyoxyalkylene diols, polyoxyalkylene triols, polytetramethylene glycols, polycaprolactone diols and triols, and the like, all of which possess at least two primary hydroxyl groups.

(b) Hydroxyl-Terminated Polyurethane (iii)

To prepare hydroxyl-terminated polyurethane (iii), polyol (ii) is reacted with polyisocyanate (ix) such as any of those hereinafter indicated. A molar excess, typically, a slight molar excess, of hydroxyl equivalents of the polyols (OH groups) with respect to the isocyanate equivalents of the polyisocyanate (NCO groups) is employed to produce hydroxyl-terminated polyurethane (iii). Advantageously, the molar ratio of NCO to OH groups is from 0.3:1.0 to 0.95:1.0, and more preferably from 0.5:1.0 to 0.90:1.0.

For the production of hydroxyl-terminated polyurethane (iii), one or more polyols (ii) described above can be employed.

Suitable polyisocyanates (ix) include any of the known and conventional organic polyisocyanates, especially organic diisocyanates, from which polyurethane polymers have heretofore been prepared. Useful polyisocyanates (ix) include 2,4-toluene diisocyanate, 2,6-toluene diisocyanate, 4,4'-diphenyl-methanediisocyanate, 2,4'-diphenyl-methanediisocyanate, isophorone diisocyanate, dicyclohexylmethane-4,4'-diisocyanate, hexamethylene diisocyanate, bis-(4-isocyanatocyclohexyl)methane and mixture of 2,4- and 4,4'-diphenylmethane-diisocyanates.

As indicated above, hydroxyl-terminated polyurethane (iii) can be prepared by the reaction of an organic polyisocyanate, for example, a diisocyanate such as any of those mentioned above, and advantageously isophorone diisocyanate, with a stoichiometric excess of the selected polyol(s), where polyol (ii) is advantageously polypropylene glycol with a functionality of between 1.85 and 2 and where the molar ratio NCO to OH groups is between 0.5:1.0 to 0.9:1.0. The reaction temperature is typically in the range of from 15° C. to 120° C. and more specifically from 60° C. to 90° C.; the reaction time is generally from 1 hour to 24 hours, and more specifically from 2 to 8 hours. The reaction is usually conducted as pressures of from 1 kilopascal to 300 kilopascal and, more specifically, from 95 kilopascal to 105 kilopascal. The reaction mixture can also contain one or more chain extenders and/or other polyols such as any of those mentioned above.

(c) Isocyanatosilane Silylating Agent (iv)

Suitable isocyanatosilane silylating agents (iv) include those represented by general formula (I):

$$OCN-R^1-Si(R^2)_a(OR^3)_{3-a} \quad (I)$$

wherein
R$^1$ is an alkylene group containing from 1 to 12 carbon atoms;
R$^2$ is alkyl group containing from 1 to 8 carbon atoms;
R$^3$ is independently alkyl group containing from 1 to 6 carbon atoms; and
a is 0, 1 ort.

Specific isocyanatosilane silylating agents (iv) that can be used herein include isocyanatomethyltrimethoxysilane, 3-isocyanatopropyltrimethoxysilane, isocyanatoisopropyltrimethoxysilane, 4-isocyanato-n-butyltrimethoxysilane, isocyanato-t-butyltrimethoxysilane, isocyanatomethylmethyldimethoxysilane, 3-isocyanatopropylmethyldimethoxysilane, isocyanatomethyltriethoxysilane, 3-isocyanatopropyltriethoxysilane, isocyanatomethylmethyldiethoxysilane, 3-isocyanatopropylmethyldiethoxysilane isocyanatoisopropyltriethoxysilane, 4-isocyanato-n-butyltriethoxysilane, isocyanato-t-butyltriethoxysilane and the like.

(d) Urethane-Forming Reaction Catalyst (viii)

Urethane-forming reaction catalysts (viii) are selected from the group consisting of titanium-containing catalyst, zirconium-containing catalysts and their mixtures.

In one embodiment, catalyst (viii) includes those of general formula (II):

$$M^{(IV)}L_4 \quad (II)$$

wherein each M is titanium$^{(IV)}$ or zirconium$^{(IV)}$, and L is a ligand selected from the group consisting of R$^4$O—, where R$^4$ is a hydrocarbon group of from 1 to 10 carbon atoms, R$^5$OP(=O)O—, where R$^5$ is at least a member selected from the group consisting of a hydrocarbon group of from 1 to 10 carbon atoms, F—, Cl—, CH$_3$OC(=O)CH=C(CH$_3$)O—, CH$_3$CH$_2$OC(=O)CH=C(CH$_3$)O—, CH$_3$C(=O)CH=C(CH$_3$)O—, CH$_3$C(=O)CH=CHC(CH$_3$)O—, CH$_2$=CHC(=O)O—, CH$_2$=C(CH$_3$)C(=O)O—, CH$_2$=CHC(=O)OCH$_2$CH$_2$C(=O)O—, CH$_2$=C(CH$_3$)C(=O)OCH$_2$CH$_2$C(=O)O—, and cyclopentadienyl.

The amount of catalyst (viii) used in preparing silylated polyurethane polymer (i) is at least a urethane reaction-forming amount; in general, from 0.0003 to 0.01 parts of the titanium or zirconium metal by weight per one hundred parts of polyol (ii), preferably from 0.0004 to 0.0035 parts by weight per titanium or zirconium metal per one hundred parts of polyol (ii), and more preferably from 0.0005 to 0.0015 parts by weight titanium or zirconium metal per one hundred parts of polyol (ii), can be utilized herein.

Suitable titanium-containing catalysts of the present invention include, but are not limited to, the group consisting of titanium (IV) bis(ethylacetoacetato)diisopropoxy, tetraisopropyl titanate, tetrabutyl titanate, titanium complexes of butyl phosphate, ethyl alcohol and isopropyl alcohol, and mixtures thereof.

Examples of commercially available titanium-containing catalysts include, but are not limited to, Tyzor® PITA, Tyzor® TPT, Tyzor® BTM and Tyzor® IAM from Dorf Ketal.

In still another embodiment, a preferred catalyst of formula (II) is wherein M is titanium$^{(IV)}$, L is a ligand selected from the group consisting of R$^4$O—, where R$^4$ is a hydrocarbon group of from 1 to 10 carbon atoms, preferably an alkyl group of from 1 to 10 carbon atoms, R$^5$OP(=O)O—, where R$^5$ is at least a member selected from the group consisting of a hydrocarbon group of from 1 to 10 carbon atoms, preferably an alkyl group of from 1 to 10 carbon atoms, F—, Cl—, and cyclopentadienyl, and more preferred catalyst of formula (II) is wherein M is titanium$^{(IV)}$, L is a ligand selected from the group consisting of consisting of R⁴O—, where R⁴ is a hydrocarbon group of from 1 to 10 carbon atoms, preferably an alkyl group of from 1 to 10 carbon atoms. The amount of these catalysts used in the preparation of silylated polyurethane polymer (i) can vary over fairly broad ranges, e.g., from 0.0003 to 0.01 parts of the titanium metal by weight per one hundred parts of polyol (ii), preferably from 0.0004 to 0.0035 parts by weight of titanium metal per one hundred parts of polyol (ii), and more preferably from 0.0005 to 0.0015 parts by weight of titanium metal per one hundred parts of polyol (ii).

In another embodiment, a preferred catalyst of formula (II) is wherein M is titanium$^{(IV)}$ and L is a ligand selected from the group consisting of R⁴O—, where R⁴ is a hydrocarbon group of from 1 to 10 carbon atoms, preferably an alkyl group of form 1 to 10 carbon atoms, CH₃C(=O)CH=CHC(CH₃)O—, CH₂=CHC(=O)O—, CH₂=C(CH₃)C(=O)O—, CH₂=CHC(=O)OCH₂CH₂C(=O)O— and CH₂=C(CH₃)C(=O)OCH₂CH₂C(=O)O—. The amount of these catalysts used in the preparation of silylated polyurethane polymer (i) can range, i.e., from 0.0005 to 0.0015 parts by weight titanium metal per one hundred parts of polyol (ii).

Suitable zirconium-containing urethane reaction-forming catalysts of the present invention include, but are not limited to, bis(cyclopentadienyl)zirconium(IV) dichloride, cyclopentadienylzirconium(IV) trichloride, zirconium(IV) tetra-acetylacetonate, zirconium tetra-acrylate, zirconium(IV) tetra-butoxide, zirconium tetra-carboxyethylacrylate, zirconium(IV) tetra-ethoxide, zirconium(IV) tetra-propoxide, and the like, all commercially available from Sigma-Aldrich®.

In one embodiment, each M is zirconium$^{(IV)}$, and L is a ligand selected from the group consisting of R⁴O—, where R⁴ is a hydrocarbon group of from 1 to 10 carbon atoms, preferably an alkyl group of from 1 to 10 carbon atoms, R⁵OP(=O)O—, where R⁵ is a hydrocarbon group of from 1 to 10 carbon atoms, preferably an alkyl group of from 1 to 10 carbon atoms, F—, Cl—, CH₃C(=O)CH=CHC(CH₃)O—, CH₂=CHC(=O)O—, CH₂=C(CH₃)C(=O)O—, CH₂=CHC(=O)OCH₂CH₂C(=O)O—, CH₂=C(CH₃)C(=O)OCH₂CH₂C(=O)O—, and cyclopentadienyl. The amount of these catalysts used in the preparation of silylated polyurethane polymer (i) can vary over fairly wide limits, e.g., from 0.0003 to 0.01 parts of zirconium metal by weight per one hundred parts of polyol (ii), more preferably from 0.0004 to 0.0035 parts by weight of zirconium metal per one hundred parts of polyol (ii) and most preferably from 0.0005 to 0.0015 parts by weight of zirconium metal per one hundred parts of polyol (ii).

In one embodiment of the present invention, the above mentioned titanium and zirconium-containing catalysts, including those of formula (II), are also suitable for curing silylated polyurethane polymer as curing catalysts. The catalysts can be used in widely ranging amounts, e.g., from 0.01 to 3.0 parts titanium or zirconium metal by weight based on 100 parts by weight of silylated polyurethane polymer (i). In another embodiment of the present invention, such catalysts can be used in amounts ranging from a total of 0.05 to 2 parts titanium and/or zirconium metal by weight based on 100 parts by weight of silylated polyurethane polymer (i).

(e) Isocyanate-Terminated Polyurethane (v)

Isocyanate-terminated polyurethane (v) can be obtained by reacting polyol (ii) with polyisocyanate (ix) in such proportions that the resulting polymers will be terminated with isocyanate groups in the presence of urethane-forming reaction catalyst (viii). In one embodiment, a molar excess of the isocyanate equivalents of polyisocyanate (ix) (NCO groups) with respect to the hydroxyl equivalents of polyol (ii) (OH groups) is employed to produce isocyanate-terminated polyurethane (iii).

Isocyanate-terminated polyurethane (v) can be prepared by the reaction of an organic polyisocyanate (ix), for example, a diisocyanate such as any of those mentioned above, and advantageously isophorone diisocyanate, with a stoichiometric deficiency of the selected polyol(s). Polyol (ii) is advantageously polypropylene glycol with a functionality of between 1.85 and 2, and where the molar ratio NCO to OH is between 1.0:1.0 and 2.0:1.0. The reaction temperature is typically in the range of from 15° C. to 120° C. and more specifically from 60° C. to 90° C.; the reaction time can generally range from 1 hour to 24 hours, and more specifically from 2 to 8 hours. The reaction can usually be conducted as pressures of from 1 kilopascal to 300 kilopascal, and more specifically from 95 kilopascal to 105 kilopascal. The reaction mixture can also contain one or more chain extenders and/or other polyols such as any of those mentioned above.

(f) Amino-Functional Silane Silylating Agent (vi) and Mercapto-Functional Silane Silylating Agent (vii)

Amino-functional silane silylating agent (vi) and mercapto-functional silane silylating agent (vii) include those of general formula (III):

$$X-R^6-Si(R^7)_b(OR^8)_{3-b} \quad (III)$$

wherein X is an active hydrogen-containing group that is reactive for isocyanate, for example, —SH, —NHR⁹ in which R⁹ is H, a linear, branched or cyclic hydrocarbon group of up to 8 carbon atoms, —R¹⁰—Si(R¹¹)$_c$(OR¹²)$_{3-c}$, —CH[C(=O)OR¹¹]CH₂C(=O)OR¹¹, —CH[C(=O)OR¹¹]CHR⁷C(=O)OR¹¹ or —CH₂CH₂C(=O)OR¹¹, each R⁶ and R¹⁰ is independently divalent hydrocarbon group of up to 12 carbon atoms, optionally containing one or more heteroatoms, each R⁷ and R¹¹ is independently a monovalent hydrocarbon group containing up to 8 carbon atoms, each R⁸ and R¹² is independently an alkyl group containing from 1 to 6 carbon atoms, and b and c each independently is 0, 1 or 2.

Specific silanes for use herein include amino-functional silane silylating agent (vi) and mercapto-functional silane silylating agent (vii) selected from the group consisting of the mercaptosilanes such as 2-mercaptoethyl trimethoxysilane, 3-mercaptopropyl trimethoxysilane, 2-mercaptopropyl triethoxysilane, 3-mercaptopropyl triethoxysilane, 3-mercaptopropyl tri-t-butoxysilane, 3-mercaptopropyl triisopropoxysilane, 2-mercaptoethyl dimethoxy ethoxysilane, 3-mercaptopropyl dimethoxy methylsilane, 3-mercaptopropyl methoxy dimethylsilane, 3-mercaptopropyl diethoxy methylsilane, 4-mercaptobutyl trimethoxysilane, 3-mercaptocyclohexyl-trimethoxysilane, 12-mercaptododecyl trimethoxy silane, 12-mercaptododecyl triethoxy silane, 2-mercapto-2-methylethyl-tripropoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane, 3-mercaptopropylphenyl triethoxysilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-ethyl-3-amino-2,2-dimethylpropylmethyldimethoxysilane, N-ethyl-aminomethyltrimethoxysilane, N-ethyl-2- aminoethyltrimethoxysilane, N-ethyl-aminomethylmethyldimethoxysilane, N-butyl-3-aminopropyl trimethoxysilane, N-butyl-3-aminopropylmethydimethoxysilane, N-butyl-3-aminopropyl triethoxysilane, N-butyl-aminomethyltrimethoxysilane, N-butyl-2-aminoethylmethyldiethoxysilane, N-butyl-aminomethylmethydimethoxysilane, N-butyl-aminomethylmethydiethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyclohexyl)-3-aminopropyltrimethoxysilane, N-(cyclohexyl)aminomethyltrimethoxysilane, N-(cyclohexyl)aminomethyltriethoxysilane, N-(cyclohexyl)aminomethyl methyldimethoxysilane, N-(cyclohexyl)aminomethyl methyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N,N-bis-(3-trimethoxysilyl-2-methylpropyl)amine, N,H-bis-(3-trimethoxysilylmethyl)amine, N,N-bis-(triethoxysilylmethyl)amine, N,N-bis-(methyldimethoxysilylmethyl)amine, N,N-bis-(3-methyldiethoxysilylmethyl) amine, N-phenyl-3-aminopropyltrimethoxysilane, N-phenyl-3-aminopropyltriethoxysilane and N-(3-trimethoxysilylpropyl)-3-amino-2-methylpropyltrimethoxysilane.

(g) Silylated Polyurethane Polymer (i)

The process for making silylated polyurethane polymer (i) can be conducted in a batchwise or a continuous manner.

Silylated polyurethane polymer (i) can be prepared by reacting polyol (ii) and/or hydroxyl-terminated polyurethane (iii) with isocyanatosilane silylating agent (iv) in the presence of urethane-forming reaction catalyst (viii).

Isocyanatosilane silylating agent (iv) can be used in a slight molar excess or a slight molar deficiency of the hydroxyl equivalents of polyol (ii) and/or hydroxyl-terminated polyurethane (iii) (OH groups) with respect to the NCO isocyanate equivalents of isocyanatosilane silylating agent (iv) (NCO groups). Advantageously, the molar ratio of NCO to OH can range from 0.7:1.0 to 1.5:1.0, preferably from 0.9:1.0 to 1.1:1.0 and more preferably from 0.98:1.0 to 1.05:1.0.

Silylated polyurethane polymer (i) can also be prepared by reacting isocyanate-terminated polyurethane (v) with amino-functional silane silylating agent (vi) and/or mercapto-functional silane silylating agent (vii) in the presence of urethane-forming reaction catalyst (viii).

For applications such as use in sealant and coating compositions, the isocyanate-terminated polyurethane (v) can be substantially fully silylated, i.e., all, or substantially all, of the isocyanate groups can be reacted with silylating agent to provide a completely silylated polyurethane polymer. The molar ratio of the isocyanate group of the polyurethane to the active hydrogen group of the silylating agent is from 1.0:1.0 to 1.5:1.0 and more specifically from 1.1:1.0 to 1.2:1.0.

However, where silylated polyurethane polymer (i) is to be incorporated into pressure-sensitive adhesive compositions, it is important that the silylation be conducted to less than completion in order that the extent of crosslinking that occurs on subsequent cure of the silylated polymer not be so great as to adversely affect, and even eliminate, the pressure sensitive adhesive characteristics of the crosslinked polymer. In this case, the molar ratio of the isocyanate group of the polyurethane to the active hydrogen group of the silylating agent is from 0.5:1.0 to 0.95:1.0, and more specifically from 0.8:1.0 to 0.90:1.0.

In conducting a partial silylation reaction, it can be useful to include a primary monoamine such as N-ethylbutylamine or similar capping reactant together with the silane as the amine will readily end-cap isocyanate groups thereby precluding them from reacting with the silane. The optimal amounts of silane and optional amine for achieving this less-than-complete silylation operation can be readily determined for a given isocyanate-terminated polymer employing known and conventional experimental techniques. Silylation of not more than 95 percent, and advantageously not more than 90 percent, of the total isocyanate groups present in the polymer is generally suitable for most pressure sensitive adhesive applications.

In order to facilitate control over the extent of incomplete silylation, it may be advantageous to include a hydroxyl-reactive monofunctional reactant with the isocyanatosilane. Suitable reactants for this purpose include monoisocyanates such as n-butylisocyanate. These and similar reactants serve to cap some of the hydroxyl groups of the polymer preventing them from undergoing silylation. Amounts of such hydroxyl-reactive monomeric reactants and isocyanatosilanes that can be utilized for partial silylation herein can be readily determined for a specific hydroxyl-terminated polyurethane polymer employing routine experimental testing.

The amount of isocyanate in the reaction mixture can be determined in accordance with ASTM D 2572, Standard Method for Isocyanate Groups in Urethane Materials or Prepolymers. The isocyanate content of the reaction mixture can be used to determine the extent of reaction and the addition point for the isocyanatosilane.

In one embodiment, silylated polyurethane polymer (i) is represented by general formula (IV):

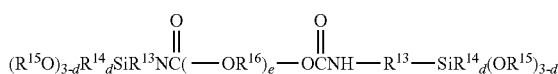

(IV)

wherein each $R^{13}$ is independently an alkylene group containing from 1 to 12 carbon atoms;

each $R^{14}$ is independently alkyl group containing from 1 to 8 carbon atoms;

each $R^{15}$ is independently alkyl group containing from 1 to 6 carbon atoms;

each $R^{16}$ is independently an alkylene group of from 2 to 4 carbon atoms;

each d is independently 0, 1 or 2; and each e is independently an integer from 3 to 340;

and at least one catalyst selected from the group consisting of titanium-containing catalysts and zirconium containing catalyst.

In one embodiment, each $R^{13}$ is independently methylene, ethylene, propylene, isopropylene or butylene, $R^{14}$ is methyl, each $R^{15}$ is independently methyl or ethyl; $R^{16}$ is —$CH_2CH(CH_3)$—; d is 0, and e is independently an integer from 35 to 250.

In one embodiment, silylated polyurethane polymer (i) is represented by general formula (V):

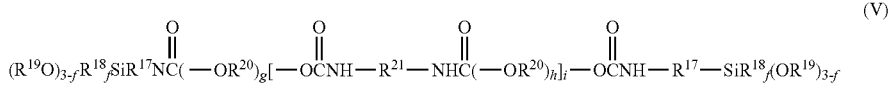

wherein
each $R^{17}$ is independently an alkylene group containing from 1 to 12 carbon atoms;
each $R^{18}$ is independently an alkyl group containing from 1 to 8 carbon atoms;
each $R^{19}$ is independently an alkyl group containing from 1 to 6 carbon atoms;
each $R^{20}$ is independently an alkylene group of from 2 to 4 carbon atoms;
each $R^{21}$ is independently a divalent acyclic, alicyclic or aromatic group containing up to 20 carbon atoms;
each f is independently 0, 1 or 2;
each g is independently an integer from 3 to 340;
each h is independently an integer from 3 to 340; and
each i is independently an integer from 1 to 5,
and at least one catalyst selected from the group consisting of titanium-containing catalysts and zirconium containing catalyst.

In one embodiment, each $R^{17}$ is independently methylene, ethylene, propylene, isopropylene or butylene, $R^{18}$ is methyl, each $R^{19}$ is independently methyl or ethyl; $R^{20}$ is —$CH_2CH(CH_3)$—; each $R^{21}$ is independently an divalent aliphatic acyclic or alicyclic group containing up to 12 carbon atoms; f is 0, g is independently an integer from 35 to 250, each h is independently an integer from 35 to 250, and i is 1, 2 or 3.

In one embodiment, silylated polyurethane polymer (i) is represented by general formula (VI):

each m is independently an integer from 3 to 340;
each n is independently an integer from 3 to 340; and
each p is independently an integer from 0 to 5,
and at least one catalyst selected from the group consisting of titanium-containing catalyst and zirconium containing catalyst.

In one embodiment, each $R^{24}$ is independently methylene, ethylene, propylene, isopropylene or butylene, $R^{25}$ is methyl, each $R^{26}$ is independently methyl or ethyl; $R^{22}$ is —$CH_2CH(CH_3)$—; each $R^{23}$ is independently an divalent aliphatic acyclic or alicyclic group containing up to 12 carbon atoms; j is 0, m is independently an integer from 35 to 250, each n is independently an integer from 35 to 250, and p is 0, 1 or 2.

Particularly useful silylated polyurethane polymers are prepared from polypropylene glycol, aliphatic diisocyanates and 3-isocyanatopropyltrimethoxysilane. The polypropylene glycol have levels of terminal ethylenic unsaturation less than 0.02, and more advantageously less than 0.008, milliequivalents per gram (meq/g) of polyol and number average molecular weight, as determined by hydroxyl end-group analysis, of from 5,000 to 22,000 grams per mole. The molar ratio of isocyanate of the isocyanatosilane (NCO) to the hydroxyl of the hydroxyl-terminated polyurethane polyurethane polymer is from 0.9:1.0 to 1.5:1.0, more particularly from 0.95:1.0 to 1.05:1.0.

Still other useful silylated polyurethane polymers are prepared from polypropylene glycols and aliphatic diisocyanates in which the polyurethane polymer is prepared by reacting from the polyalkylene glycol, more specifically polypropy-

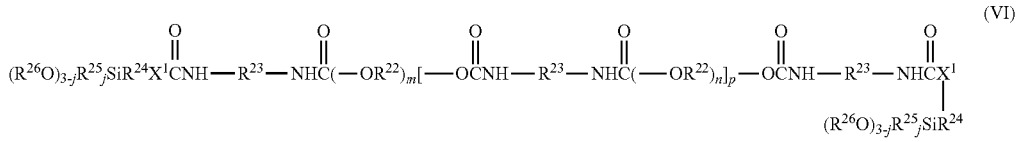

wherein
each $X^1$ is independently —O—, —S— or —$NR^{27}$— in which $R^{27}$ is H, a linear, branched or cyclic hydrocarbon group of up to 8 carbon atoms —$R^{28}$—$Si(R^{29})_k(OR^{28})_{3-k}$, —$CH[C(=O)OR^{31}]CH_2C(=O)OR^{31}$, —$CH[C(=O)OR^{31}]CHR^{32}C(=O)OR^{31}$ or —$CH_2CH_2C(=O)OR^{31}$; wherein each $R^{31}$ and $R^{32}$ are independently a monovalent hydrocarbon group containing up to 8 carbon atoms;
each $R^{22}$ is independently an alkylene group of from 2 to 4 carbon atoms;
each $R^{23}$ is independently a divalent acyclic, alicyclic or aromatic group containing up to 20 carbon atoms;
each $R^{24}$ and $R^{28}$ is independently a divalent hydrocarbon group of up to 12 carbon atoms, optionally containing one or more heteroatoms,
each $R^{25}$ and $R^{29}$ is independently a monovalent hydrocarbon group containing up to 8 carbon atoms,
each $R^{26}$ and $R^{30}$ is independently an alkyl group containing from 1 to 6 carbon atoms;
each j and k is independently 0, 1 or 2;

lene glycol, with the diisocyanate, more specifically an aliphatic diisocyanate, in a stoichiometric excess of the isocyanate groups of the diisocyanate relative to the hydroxyl groups of the polyalkylene glycol, and prior to completion of the reaction to form the polyurethane, the isocyanatosilane is added to the reaction mixture. The molar ratio of the isocyanate groups of the diisocyanate to the hydroxyl groups of the polyalkylene glycol is from 1.01:1.0 to 1.3:1.0. The isocyanatosilane is added to the reaction mixture comprising diisocyanate and polyalkylene glycol before the reaction reaches completion. The polyurethane polymer at the addition point of the isocyanatosilane reactant is a polyurethane polymer composition containing both isocyanate groups and hydroxyl groups. The isocyanatosilane reacts with the residual hydroxyl groups in the polyurethane polymer mixture.

In one embodiment, the polyalkylene glycol is a polypropylene glycol having levels of terminal ethylenic unsaturation less than 0.02, and more advantageously less than 0.008, milliequivalents per gram (meq/g) of polyol and number average molecular weight, as determined by hydroxyl end-group analysis, of from 5,000 to 22,000 grams per mole, and more specifically from 8,000 to 12,000 grams per mole. The diisocyanate is advantageously an aliphatic diisocyanate, and more specifically isophorone diisocyanate. The molar ratio of isocyanate group of the diisocyanate to polyalkylene glycol is from 0.35:1.0 to 1.30:1.0, more specifically between 0.5:1.0 and 1.10:1.0 and still more specially 0.5:1.0 to 0.9:1.0. The molar ratio of isocyanate of the isocyanatosilane (NCO) to the hydroxyl of polyurethane polymer containing hydroxyl groups at the point of addition of the isocyanatosilane is from 0.9:1.0 to 1.5:1.0, more particularly from 0.95:1.0 to 1.05:1.0.

(h) Optional Components

Optional components that can be mixed with silylated polyurethane polymer (i) of the invention to obtain a silylated polyurethane polymer composition include organic and inorganic compounds that contribute to the processing, flexibility and/or curing of silylated polyurethane polymers (i) and/or their cured properties. Optional components include organic solvent, polysiloxane, isocyanate-reactive scavenging agent, water scavenger agent, desiccant, non-silicon-based epoxy hardener, surfactant, colorant, plasticizer, extender, filler, reinforcing agent, adhesion promoter, organic resin modifier, UV stabilizer, color stabilizer, wetting agent, flow and leveling additive, thixotrope, defoamer, and the like.

Organic solvents are used to lower the viscosity and improve the flow properties of the uncured silylated polyurethane polymer compositions, which are especially useful when the silylated polyurethane polymer composition is used as a coating. A variety of solvents may be mentioned as exemplary, for example, alcohols, glycols, triols, polyols, glycol ethers, esters, ketones, hydrocarbon, and the like.

Representative and non-limiting examples of specific solvents include mono-alcohols, such as methanol, ethanol, 1-propanol, 2-propanol (i-propanol), 2-methyl-1-propanol (i-butanol), 2-methyl-2-propanol (tert-butanol), 1-butanol, 2-butanol, 2-methyl-1-butanol, 2-methyl-2-butanol, 2,2-dimethyl-1-propanol, 1-pentanol, 2-pentanol, 4-methyl-2-pentanol; glycols such are propylene glycol, 1,3-butanedial, 1,4-butane diol, 2-methyl-1,3-propanediol, 2-methyl-2,4-pentanediol (hexylene glycol), diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate-co-propoxylate triol, glycerol propoxylate, pentaerythritol; glycol ethers such as 1-methoxy-2-propanol (propylene glycol methyl ether), 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxyl)ethanol, 2-(2-ethoxyethoxyl)ethanol, 2-(2-propoxyethoxyl)ethanol, 2-(2-butoxyethoxyl)ethanol (butyl carbitol), di(propylene glycol) butyl ether, tri(ethylene glycol)monomethyl ether, tri(ethylene glycol)monoethyl ether, tri(ethylene glycol)monobutyl ether, poly(ethylene glycol) methyl ether, poly(ethylene glycol)dimethylether, poly(ethylene glycol-co-propylene glycol), poly(ethylene glycol-co-propylene glycol)monobutyl ether, poly(propylene glycol) monobutyl ether, di(propylene glycol)dimethylether; esters including methyl acetate, ethyl acetate, ethyl lactate, 2-methoxyethyl acetate, 2-ethoxyethyl acetate, 2-butoxyethyl acetate, 2-(2-methoxyethoxyl)ethyl acetate, 2-(2-ethoxyethoxyl)ethyl acetate, 2-(2-butoxyethoxyl)ethyl acetate, glycol diacetate, triethylene glycol diacetate, propylene glycol methyl ether acetate (1-methoxy-2-propanol acetate), propylene glycol ethyl ether acetate, ketones including acetone, methyl ethyl ketone, 2,4-pentane dione, diacetone alcohol and hydrocarbons including toluene, xylene, naptha, mineral spirits, hexane, heptane, cyclohexane and mixtures thereof.

In certain embodiments, the solvent can be present in the silylated polyurethane polymer compositions of the invention in an amount ranging from 1 to 80 percent by weight, advantageously from 10 to 30 percent by weight, and in some embodiments, from 10 to 25 percent by weight, based on the total weight of the silylated polyurethane polymer composition.

Surfactants may be used to aid in the wetting and leveling of the silylated polyurethane polymer compositions of the invention, especially where the silylated polyurethane polymer composition is used as a coating. Useful surfactants include nonionic, cationic, anionic, amphoteric and/or zwitterionic surfactants. The surfactants are typically hydrocarbon-based, silicone-based or fluorocarbon-based. Useful surfactants having short chain hydrophobes. Other useful surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates, and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and mixtures thereof.

Representative, non-limiting examples of surfactants include alkyl acetylenic diols sold by Air Products under the trade name SURFONYL®, pyrrilodone-based surfactants sold by ISP under the trade name SURFADONE-LP® 100, 2-ethyl hexyl sulfate, isodecyl alcohol ethoxylates sold by Rhodia under the trade name RHODASURF® DA 530, ethylene diamine alkoxylates sold by BASF under the trade name TETRONICS®, ethylene oxide/propylene oxide copolymers sold by BASF under the trade name PLURONICS®, and diphenyl ether Gemini type surfactants sold by Dow Chemical Corporation under the trade name DOWFAX®.

In general, the silylated polyurethane polymer composition herein can contain optional surfactant(s) in an amount of from 0.01 to 5 weight percent, advantageously from 0.05 to 2 weight percent and in certain embodiments, from 0.1 to 1 weight percent based on the total weight of the silylated polyurethane polymer composition.

Silylated polyurethane polymer composition of the invention can include a colorant. As used herein, the term "colorant" means any substance that imparts color and/or other opacity and/or other visual effect to the polymer. The colorant can be added to the silylated polyurethane polymer composition in any suitable form such as discrete particles, dispersions, solutions, flakes, etc. A single colorant or a mixture of two or more colorants can be used in the silylated polyurethane polymer composition of the invention.

Useful colorants include pigments, dyes and tints such as those used in the paint industry and/or listed in the Dry Color Manufacturers Association (DCMA), as well as special-effect materials. A useful type of colorant can be a finely divided solid powder that is insoluble but wettable under the conditions of use. A colorant can be organic or inorganic and can be agglomerated or non-agglomerated. Colorants can be added into the silylated polyurethane polymer composition by use of a grinding vehicle such as an acrylic grinding vehicle the use of which is familiar to those skilled in the art.

Illustrative useful pigments and pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Useful dyes include, but are not limited to, those that are solvent and/or aqueous based such as phthalo green or blue, iron oxide, bismuth vanadate, anthraquinone, perylene, aluminum and quinacridone.

Useful tints include, but are not limited to, pigments dispersed in water-based or water miscible carriers such as AQUA-CHEM® 896 commercially available from Degussa, Inc., CHARISMA COLORANTS® and MAXITONER INDUSTRIAL COLORANTS® commercially available from Accurate Dispersions division of Eastman Chemical, Inc.

In general, the colorant can be present in the silylated polyurethane polymer composition in any amount that is sufficient to impart the desired visual and/or color effect. The colorant can comprise from, for example, 1 to 65 weight percent of the silylated polyurethane polymer composition, such as from 3 to 40 weight percent or 5 to 35 weight percent thereof based on the total weight of the silylated polyurethane polymer composition.

The silylated polyurethane polymer composition of the invention can include a filler. The filler can be any inorganic or organic filler that reinforces and/or extends the silylated polyurethane polymer composition. Useful fillers include, for example, reinforcing fillers such as carbon black, fumed silica, precipitated silica, clays, talc, aluminum silicates, metal oxides and hydroxides, and extending fillers such as treated and untreated calcium carbonates, and the like. Fillers can be in the form of powders, particulates, aggregates, agglomerates, platelets, fibers, etc. In one embodiment, one or more fillers are combined with silane coupling agents.

To further improve the physical strength of a cured silylated polyurethane polymer compositions herein, reinforcing carbon black can be used as a main filler resulting in black or darkly colored silylated polyurethane polymer compositions. Several commercial grades of carbon black useful in this invention are commercially available such as the Corax® products from Degussa. To obtain colorless translucent silylated polyurethane polymer composition, higher levels of fumed silica or precipitated silica can be used as the main filler to the exclusion of carbon black. The surface area of the filler can be more than 20 meters$^2$/gram.

Treated calcium carbonates having particle sizes from 0.07 microns to 4 microns are preferred fillers and are available under several trade names, such as: "Ultra Pflex®" and "Hi Pflex®" from Specialty Minerals; "Winnofil® SPM" and "Winnofil® SPT" from Zeneca Resins; "Hubercarb® 1 Qt", "Hubercarb® 3 Qt" and "Hubercarb® W" from Huber and "Kotomite®" from ECC; "Omyabond® 520", "Omyacarb® 3", "Omyacarb® 5" from Omya, and the like. These fillers can be used either alone or in combination.

The optional fillers can be included in the silylated polyurethane polymer composition in an amount of up to 80 weight percent, advantageously in an amount of up to 50 weight percent, and in certain embodiments, in an amount of from 20 weight percent to 50 weight percent based on the total weight of the silylated polyurethane polymer composition.

The silylated polyurethane polymer composition herein can optionally include plasticizers. Exemplary plasticizers include phthalates, dipropylene and diethylene glycol dibenzoates and mixtures thereof, epoxidized soybean oil, and the like. Useful commercial dioctyl and diisodecyl phthalates include "Jayflex® DOP" and "Jayflex® DIDP" from Exxon Chemical. Dibenzoate plasticizers are available as "Benzoflex® 9-88", "Benzoflex® 50" and "Benzoflex® 400" from Velsicol Chemical Corporation; "Mesamoll®" from Lanxess. The optional plasticizer can represent up to 100 parts by weight per hundred parts of the silylated polyurethane polymer composition with up to 40 parts by weight per hundred parts of the silylated polyurethane polymer composition being preferred.

Useful optional thixotropes include various castor waxes, fumed silica, treated clays and polyamides. Commercially available thixotropes include, for example, Aerosil from Degussa, Cabo-Sil TS 720 from Cabot, Castorwax from CasChem, Thixatrol and Thixcin from Rheox, Crayvallac from Crayvalley Corp. and Dislon from King Industries.

The optional isocyanate-reactive scavenging agent is an agent possessing at least one active hydrogen and that reacts with isocyanate at a rate greater than that of undesired reactions that cause an increase in viscosity such as the further reaction of isocyanate with hydroxyl-terminated polymers if there is still hydroxyl present, reaction of isocyanate with urethane to form allophanate, reaction of isocyanate with urea to form biuret and reaction of the hydroxyl-terminated polymers with an alkoxysilyl group to generate an alcohol.

The isocyanate-reactive scavenging agent can be added to the reaction mixture of isocyanatosilane, hydroxyl-terminated polymer and optionally other ingredients, such as catalysts and non-protic solvents, at a desired point at or near the end of the silylation reaction. It is understood that for di- or polyisocyanate-extended polyols the hydroxyl-terminated polymer may contain residual isocyanate, either from partially reacted di- or polyisocyanate, or from unreacted di- or polyisocyanate. The residual isocyanate present in the silylated polyurethane polymer composition can come from the di- or polyisocyanate used to chain extend polyol (ii), or from the isocyanatosilane used to react with the hydroxyl-terminated polymer. The desired point for the addition of the isocyanate-reactive agent can be determined by the viscosity of the reaction mixture, or by some other method. Thus, the isocyanate-reactive scavenging agent is added to the reaction mixture at a particular viscosity depending on formulation and the desired properties of the final product. In one embodiment of the invention, the isocyanate-reactive scavenging agent is added to the reaction mixture at a viscosity range from 1,000 cP to 150,000 cP when measured at a temperature of 25° C., and in another embodiment of the invention from 30,000 cP to 75,000 cP when measured at a temperature of 25° C. In this manner, the isocyanate-reactive scavenging agent minimizes batch-to-batch variation of the final viscosity of the silylated polyurethane polymer composition.

The isocyanate-reactive scavenging agent is allowed to react with the isocyanate-containing reaction mixture for sufficient time to ensure that all of the residual isocyanate has reacted. The isocyanate-reactive scavenging agent can be added in a stoichiometric amount relative to the residual isocyanate, but it is preferable to add an excess of the isocyanate-reactive scavenging agent to ensure that all of the residual isocyanate is reacted and to inhibit the reaction of the residual hydroxyl groups of the hydroxyl-terminated polymer with the alkoxysilyl groups. In one embodiment of the invention, the amount of isocyanate-reactive scavenging agent added to the isocyanate-containing reaction mixture is from 0.01 to 5 weight percent based upon the weight of the silylated polyurethane polymer composition and from 0.01 to 0.5 weight percent based upon the weight of the silylated polyurethane polymer composition in another embodiment of the invention, and in still another embodiment from 0.02 to 0.2 weight percent based upon the weight of the silylated polyurethane polymer composition.

According to one embodiment of the invention, the silylated polyurethane polymer composition of reduced isocyanate content contains less than 0.1 weight percent isocyanate, when measured as % NCO, and in another embodiment of the invention the silylated polyurethane polymer composition of reduced isocyanate content contains less than 0.02 weight percent isocyanate, when measured as % NCO.

The isocyanate-reactive scavenging agent can be added neat or as a mixture with one or more other materials. The disappearance of the isocyanate can be determined directly by analytical techniques such as infra-red spectroscopy and titration, or indirectly by the measurement of constant viscosity of the reaction mixture. The synthesis can be monitored using titration (ASTM 2572-87) or infrared analysis. Silylation of the urethane polymers is considered complete when no residual —NCO can be detected by either technique.

According to one embodiment of the invention, the isocyanate-scavenging agent is a mono-alcohol or a mixture of different mono-alcohols, secondary amine or mercaptan.

Mono-alcohols are generally preferred in that they have low odor, do not contribute to the color of the silylated polyurethane polymer composition and inhibit the reaction of residual hydroxyl-terminated polymer with alkoxysilyl groups. Other active hydrogen compounds such as amines and organic acids typically have strong odors, can impact color and can catalyze the reaction of the residual hydroxyl-terminated polymer with alkoxysilyl groups.

In one embodiment of the invention, the selected isocyanate-reactive scavenging agent is one that has little or no effect on the physical or cure properties of the silylated polyurethane polymer composition or on the properties of an any cured material, for example, coating, sealant, adhesive, etc., made from the silylated polyurethane polymer composition herein.

The monoalkanol isocyanate-reactive scavenging agent possesses the general formula: $R^{31}$—OH in which $R^{31}$ is a monovalent hydrocarbon radical containing from 1 to 30 carbon atoms and optionally may contain a heteroatom. The heteroatom can, for example, be oxygen, which can form organofunctional groups, such as ethers, ester, and ketone groups. In another embodiment, the hydrocarbon radical is selected from the group consisting of linear, branched and cyclic alkyl, and alkenyl, aryl, arenyl and aralkyl.

Representative non-limiting examples of $R^{15}$ include alkyl, such as methyl, ethyl, propyl, isopropyl, butyl, pentyl, dodecyl, cyclohexyl, cyclopentyl, and 3-methylhexyl; alkenyl, such as vinyl, allyl and methallyl; aryl, such as phenyl; arenyl, such as 4-methylphenyl, 2,4-dimethylphenyl and 2,4,6-trimethylphenyl; and aralkyl, such as benzyl and 2-phenylethyl.

In another embodiment of the invention, the mono-alcohols have the hydroxyl group attached to a primary carbon. A primary carbon is one in which at least two hydrogen atoms are attached to the carbon, —$CH_2OH$. The mono-alcohol scavenging agents of the invention are more reactive with the isocyanate group because they are less sterically hindered.

According to one embodiment of the invention, useful mono-alcohols as isocyanate-reactive scavenging agents include methanol, ethanol, n-propanol, isopropanol, n-butanol, sec-butanol, tert-butanol, hexanol, cyclohexanol and the like, and mixtures thereof.

In a specific embodiment of the invention, when the terminal alkoxysilyl group of the silylated polyurethane polymer is a methoxysilyl, the specific isocyanate-reactive scavenging agent is methanol. In another specific embodiment of the invention, when the terminal alkoxysilyl group of the silylated polyurethane polymer is an ethoxysilyl, the specific isocyanate-reactive scavenging agent is ethanol.

In one embodiment of the invention, silylated polyurethane polymer (i) of reduced isocyanate content resulting from the addition of isocyanate-scavenging agent as disclosed herein, following aging, exhibits a viscosity of 1,000 cP to 150,000 cP, more specifically from 30,000 cP to 75,000 cP and most specifically from 35,000 cP to 65,000 cP, when measured at 25° C.

Optional antioxidants that can be added to the polymer of the invention to provide protection against oxidative change. The quantities in which antioxidants can be used vary within wide limits, for example, from 0.01 to 10 percent by weight and, more particularly, from 0.01 to 3 percent by weight, based on the weight of the silylated polyurethane polymer composition.

Water scavenging agent can optionally be added to the silylated polyurethane polymer composition herein to improve its package stability and to prevent premature curing. It will be understood herein that any known or commercially used water scavenger agent can be employed herein. One type of water scavenger agent can be an alkoxysilane, for example, vinyltrimethoxysilane, methyltrimethoxysilane, and the like. The concentration of water scavenger agent can be in the range of from 0 to 5 percent by weight based on the weight of the silylated polyurethane polymer composition.

In an alternative to or in addition to optional water scavenging agent, desiccant can optionally be added to the silylated polyurethane polymer composition herein to improve its package stability and to prevent premature curing. Any known or conventional desiccant, for example, silica gel, can be employed herein for such purposes.

According to one embodiment of the invention, a color stabilizer can be added to silylated polyurethane polymer composition to reduce its yellowing overtime. Representative non-limiting examples of color stabilizers include, for example, triphenyl phosphite, diphenyl-alkyl phosphites, phenyl-dialkyl phosphites, tris(nonylphenyl)phosphite, trilauryl phosphite, trioctadecyl phosphite, distearyl-pentaerythritol diphosphite, tris(2,4-di-tert-butylphenyl)phosphite, diisodecyl pentaerythritol diphosphite, bis(2,4-di-tert-butylphenyl)-pentaerythritol diphosphite, bis(2,4-di-cumylphenyl)-pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, bis(2,4-di-tert-butyl-6-methylphenyl)-methyl phosphite, bis(2,4-di-tert-butyl-6-methylphenyl)-ethyl phosphite, 2,2',2''-nitrilo-[triethyltris(3,3',5,5'-tetra-tert-butyl-1,1'-biph-enyl-2,2'-diyl)phosphite], 2-ethylhexyl (3,3',5,5'-tetra-tert-butyl-1,1'-biphenyl-2,2'-diyl)phosphite-.

Examples of commercial available color stabilizers include, but are not limited to, Doverphos® from Dover Chemical Corporation, such as Doverphos® 4 (TNPP) (trinonylphenol phosphate), Doverphos® 4-HR (TNPP) (tris-nonylphenol phosphite+0.75% triisopropanolamine), Doverphos® 4-HR Plus (TNPP) (trisnonylphenol phosphite+1.0% triisopropanolamine), Doverphos® HiPure 4 (TNPP) (tris-nonylphenol phosphite 0.1% max. free nonylphenol), Doverphos® HiPure 4-HR (TNPP) [trisnonylphenol phosphite 0.1% max. free nonylphenol (+0.75% triisopropanolamine)], Doverphos® 10 (TPP) (triphenyl phosphate), Doverphos® 10 HR (TPP) (triphenyl phosphite+0.5% triisopropanolamine), Doverphos® 213 (DPP) (diphenyl phosphate), Doverphos® 7 (PDDP) (phenyl diisodecyl phosphate), Doverphos® 8 (DPDP) (diphenyl isodecyl phosphate), Doverphos® 9 (DPIOP) (diphenyl isooctyl phosphate), Doverphos® 11 (tetraphenyl dipropyleneglycol diphosphite), Doverphos® 12 [poly(dipropyleneglycol) phenyl phosphate], Doverphos® 613 [alkyl ($C_{12}$-$C_{15}$) bisphenol A phosphate], Doverphos® 675 [alkyl ($C_{10}$) bisphenol A phosphate], Doverphos® 6 (TDP) (triisodecyl phosphate), Doverphos® 49 (TTDP) [tris(tridecyl)phosphate], Doverphos® 53 (TLP) (trilauryl phosphate), Doverphos® 72 [tris(dipropylene glycol)phosphate], Doverphos® 253 (dioleyl hydrogen phosphate).

In one embodiment of the present invention, the amount of color stabilizer used can vary from 0.01% to 3% by weight per one hundred parts of polyol (ii), and preferably from 0.5% to 2% by weight per one hundred parts of polyol (ii) used in the preparation of the silylated polyurethane polymer composition.

In one embodiment of the present invention, the preparation of silylated polyurethane polymer (i) is carried out at temperatures of from 0 to 150° C. In another embodiment of the present invention, the process is carried out at temperatures of from 60 to 100° C. and at a pressure of the ambient atmosphere, e.g. from 900 to 1100 hPa.

Silylated polyurethane polymer (i) is typically cured by exposure to moisture (water) at temperatures ranging from −10° C. to 80° C. at sub-atmospheric, atmospheric or supra-atmospheric pressures. Generally, moisture content in the air of from 15 to 100 percent relative humidity and more advantageously from 30 to 90 percent relative humidity provides acceptable cure times.

Essentially tin-free silylated polyurethane polymer (i) exhibits increased stability toward atmospheric moisture compared to substantially the same silylated polyurethane polymer using non titanium-containing and/or zirconium-containing catalyst. In one embodiment, the silylated polyurethane polymer composition containing a titanium-containing catalyst, zirconium-containing catalyst or mixtures thereof, and residue moisture exhibits a less than a 20% increase in viscosity following an exposure to for two weeks at room temperature of 23° C. at atmospheric pressure and a relative humidity of 50 percent.

Silylated polyurethane polymer (i) does not require special handling under conditions which rigorously exclude moisture. Since the polymer is essentially tin-free, it is especially advantageous for application as, or in, an adhesive, sealant, coating, gasket, industrial rubber product, cosmetic product and the like.

Various features of the invention are illustrated by the examples presented below.

EXAMPLES

Table 1 lists the materials used in the experimental section.

TABLE 1

Materials Used in the Experiments

| Chemical Names | Supplier | Commercial name or Abbreviation |
|---|---|---|
| Polypropylene oxide diol, Mn 8000 | Huang Ma | PO |
| Isophorone diisocyanate | Bayer | IPDI |
| Isocyanatopropyltrimethoxysilane | Momentive Performance Materials Inc. | A Link 35 Silane |
| vinyltrimethoxysilane | Momentive Performance Materials Inc. | A-171 Silane |
| 3,5-Di-tert-butyl-4-hydroxyhydrocinnamic acid, $C_{7-9}$ branched alkyl esters | BASF | Irganox 1135 |
| Triphenyl phosphite | Dover Chem | TPP |
| Diisodecyldiphthalate | ExxonMobil Chemical | DIDP |
| CalWhite (ground calcium carbonate) | Imerys | |
| Aminopropyltrimethoxysilane | Momentive Performance Materials Inc. | Silquest A-1110 Silane |
| Ultra Pflex (precipitated calcium carbonate) | Mineralsthch | |
| Amino-functional oligosiloxane | Momentive Performance Materials Inc. | Silquest VX225 Silane |
| Catalyst | | |
| Titanium, bis(ethylacetoacetato)diisopropoxy | Dorf Ketal | Tyzor PITA |
| Tetraisopropyl Titanate | Dorf Ketal | Tyzor TPT |
| Tetrabutyl Titanate | Dorf Ketal | Tyzor BTM |
| Titanium complexes of butyl phosphate, ethyl alcohol and isopropyl alcohol | Dorf Ketal | Tyzor IAM |
| Dibutyltin Dilaurate | Momentive Performance Materials Inc. | DBTDL |
| Bismuth(III) neodecanoate | Vertellus Specialties | Coscat 83 |
| Zirconium complex | King Industries | K-Kat XC9213 |
| 1,4-diazabicyclo[2.2.2]octane | Sigma Aldrich | DABCO |

Examples 1-6 and Comparative Examples 1-2 were prepared using various catalysts by the general method described below.

To a 1-liter resin kettle, 400 gram of dried PO (0.05 mole), 2 grams of Irganox 1135 and a catalyst were charged, and then heated up to 40° C. with agitation. 5.18 grams of IPDI (0.05 mole) was added into the kettle to start the reaction. After isotherm, the temperature was adjusted to 75-90° C. depending upon the reaction rate of each experiment. The reaction proceeded under $N_2$ protection and monitored by increasing of viscosity and depletion of NCO content. When the reaction reached a desired capping point, 11.64 grams of A-Link 35 (0.05 mole) was added in. The mixture was reacted at the same temperature until the NCO reached near zero by titration, then the reaction was finished by turning off the heat and adding 0.5 gram of methanol and 3.5 grams of Silquest A-171 Silane.

Example 5 was prepared in the same manner as described above, except additional 2 grams of TPP was added together with Irganox 1135 before starting the reaction to stabilize the color of the polymer when using titanate-containing catalyst.

Example 7 was prepared by the following method: To a 1-liter resin kettle, 423 gram of dried PO (0.0535 mole), 2.1 grams of Irganox 1135 and Tyzor TPT (10 ppm of Ti) was charged, and then heated up to 80° C. with agitation. Then 21.42 grams of IPDI (0.0934 mole) was added into the kettle. The reaction then proceeded at 80° C. under $N_2$ protection. When the NCO level was reduced to 0.83% by titration, 20.82 grams of N-ethylaminoisopropyltrimethoxysilane (A-link 15) was added. The reaction continued at 70-75° C. until the NCO level reached 0% by titration. The viscosity of finished product was 24,755 cP at 25° C.

The catalyst and its dosage used for each experiment were listed in Table 2. The reaction temperatures, duration time from the addition of IPDI to finish the reaction, and final viscosity were recorded in Table 2 as well.

TABLE 2

Different Catalysts for Silane-Terminated Polyurethanes

|  | Catalyst | ppm of metal | Reaction Temperature (° C.) | Reaction Duration (min) | Finished Viscosity @ 25 C. (cP) |
| --- | --- | --- | --- | --- | --- |
| Example 1 | Tyzor PITA | 17 | 75-85 | 160 | 34,500 |
| Example 2 | Tyzor TPT | 10 | 80-90 | 190 | 31,500 |
| Example 3 | Tyzor BTM | 10 | 80-90 | 240 | 31,600 |
| Example 4 | Tyzor IAM | 0.02% | 70-80 | 260 | 33,000 |
| Example 5 | Tyzor TPT | 10 | 80-85 | 170 | 39,000 |
| Example 6 | K-kat XC9213 & DABCO | 0.1% of XC9213 + 0.075% of DABCO | 70-80 | >2 days | 34,000 |
| Example 7 | Tyzor TPT | 10 | 80-85 | 170 | 24,755 |
| Comparative Example 1 | DBTDL | 10 | 70-80 | 190 | 33,000 |
| Comparative Example 2 | Coscat 83 | 8 | 70-80 | 180 | 45,600 |

The dosage of each catalyst varied based on the reaction rate. The reaction records showed the Tyzor TPT and BTM as catalyst provided the similar reaction rate when compared with DBTDL and Coscat 83. When Tyzor PITA and IAM were used as catalyst, the reaction either required more loading of the catalyst or took long time to complete.

The properties of the silylated polyurethane polymers obtained from Examples 1-7 and Comparative Examples 1-2 were tested.

The silylated polyurethane polymers were mixed with 1% DBTDL, based on the weight of the silylated polyurethane polymer, and then casted into a film and cured in a humidity chamber at 23° C. and 50% humidity for 3 days. Tensile properties were tested according to ASTM D 412, and hardness was tested under ASTM C 661. The test results are listed in the Table 3. Mechanical properties of the zirconium-silylated polyurethane polymer compositions and the comparative silylated polyurethane polymer compositions were essentially the same.

TABLE 3

Mechanical Properties of Experimental Silane Terminated Polyurethanes

|  | Tensile Strength at Break (psi) | Elongation at Break (%) | Modulus at 100% E (psi) | Hardness Shore A |
| --- | --- | --- | --- | --- |
| Example 1 | 102 | 198 | 65 | 20 |
| Example 2 | 88 | 177 | 60 | 18 |
| Example 3 | 104 | 167 | 74 | 25 |
| Example 4 | 82 | 234 | 46 | 20 |
| Example 5 | 84 | 191 | 54 | 20 |
| Example 6 | 76 | 133 | 65 | 23 |

TABLE 3-continued

Mechanical Properties of Experimental Silane Terminated Polyurethanes

|  | Tensile Strength at Break (psi) | Elongation at Break (%) | Modulus at 100% E (psi) | Hardness Shore A |
| --- | --- | --- | --- | --- |
| Example 7 | 99 | 61 | 278 | 32 |
| Comparative Example 1 | 105 | 210 | 63 | 23 |
| Comparative Example 2 | 108 | 181 | 72 | 25 |

Moisture sensitivity of the silylated polyurethane compositions were evaluated by placing the compositions in open dishes on counter top for a period of time, and then measure the viscosity periodically.

The viscosity of the silylated polyurethane polymer compositions was measured at various times, recorded and presented in Chart 1. These data showed the viscosity at various times for each silylated polyurethane polymer composition as the catalyst used during the synthesis was varied. The silylated polyurethane polymer compositions prepared using Tyzor TPT (Examples 2 and 7) and Tyzor BTM (Example 3) were more stable, i.e., less sensitive to moisture, than the silylated polyurethane polymer compositions prepared using DBTDL (Comparative Example 1) and Tyzor PITA (Example 1).

A Konica Minolta Colorimeter was used for color measurement of all liquid silylated polyurethane polymer compositions and solid films of cured samples. For liquid silylated polyurethane polymer compositions, the color readings were converted to the scale of Pt—Co. Results of the color measurements were listed in the Tables 4 and 5.

The yellowness of the silylated polyurethane polymer compositions varied as the type and dosage of titanium-containing catalyst used. The yellowness also reduced upon storing on counter-top.

Additionally, if 0.5% by weight of aryl phosphite, such as triphenyl phosphite, was used, as stabilizers in the Example 5, the color generated by the catalyst was less initially compared to other Examples. The color continuously was reduced when stored on counter top. One month late the color reduced to the levels same to the Comparative Examples.

TABLE 4

Yellowing Reduction of
the Silylated Polyurethane Polymer Compositions on Storage

| | Color Measurement in Pt—CO | |
|---|---|---|
| | Initial | in 40 days |
| Example 1 | 193 | 150 |
| Example 2 | 157 | 135 |
| Example 3 | 171 | 149 |
| Example 4 | >300 | >250 |
| Example 5 | 114 | 36 |
| Comparative Example 1 | N/A | 42 |
| Comparative Example 2 | N/A | 20 |

To measure the color of the cured silylated polyurethane polymer compositions, 1% of DBTDL was added into each of the silylated polyurethane polymer compositions, and then cured in a chamber at 23° C. and 50% humidity for seven days. The cured clear films with thickness of 1.5 millimeters were placed on a top of white paper sheet, and measured the color using the Konica Minolta Colorimeter.

Table 5 lists the color measurement of the cured sheets. After curing, the polymer prepared using Tyzor TPT (Example 2) had the same color as compositions prepared using tin or bismuth (Comparative Examples 1 and 2).

TABLE 5

Color Comparison of Cured Silylated Polyurethane
Polymer Compositions

| | Color measurement after cure | | |
|---|---|---|---|
| | L | a | b |
| Example 2 | 91.1 | 0.21 | −0.05 |
| Comparative Example 1 | 89.88 | 0.19 | −0.04 |
| Comparative Example 2 | 90.19 | 0.33 | −0.47 |
| White sheet as background | 94.1 | 0.39 | −1.05 |

The silylated polyurethane polymer compositions of Example 7 was then made into a lab floor adhesive formulation using non-tin catalyst—Tyzor PITA.

In a DAC Speed Mixer, 40 grams of the silylated polyurethane polymer composition of Example 7 was mixed with 1 gram of vinyltrimethoxysilane (Silquest A-171 Silane), 9 grams of diisodecyldiphthalate, 30 grams of CalWhite, and 17 grams of Ultra Pflex, and then 2.4 grams of aminopropyltrimethoxysilane (Silquest A-1110 Silane), 0.5 grams of VX225 and 0.23 grams of Tyzor PITA were added and mixed.

Mechanical Properties of the floor adhesive made from the silylated polyurethane polymer compositions of Example 7 are listed in Table 6.

TABLE 6

Mechanical Properties of the Floor Adhesive

| Skin time | 3.5 hr |
|---|---|
| Tensile Strength at Break (psi) | 301 |
| Elongation at Break (%) | 88 |
| Young's modulus (psi) | 881 |
| Hardness Shore A | 58 |

These examples are to be construed as exemplary in nature only and are not intended in any way to limit the appended claims. It is contemplated that a person having ordinary skill in the art would be able to produce obvious variations of the subject matter and disclosures herein contained that would be by reason of such ordinary skill within the literal or equitable scope of the appended claims.

What is claimed is:

1. A process for the preparation of silylated polyurethane polymer (i) from the reaction of polyol (ii) and/or hydroxyl-terminated polyurethane (iii) with isocyanatosilane silylating agent (iv), or the reaction of isocyanate-terminated polyurethane (v) with amino-functional silane silylating agent (vi) and/or mercapto-functional silane silylating agent (vii), the process comprising
   (a) employing at least one non-tin urethane-forming reaction catalyst (viii) for the preparation of hydroxyl-terminated polyurethane (iii), isocyanate-terminated polyurethane (v) and/or silylated polyurethane polymer (i), urethane-forming reaction catalyst (viii) being selected from the group consisting of titanium-containing catalyst and zirconium-containing catalyst having the general formula (II):

$$M^{(IV)}L_4 \qquad (II)$$

wherein each M is titanium$^{(IV)}$ or zirconium$^{(IV)}$, and L is a ligand selected from the group consisting of R$^4$O—, where R$^4$ is a hydrocarbon group of from 1 to 10 carbon atoms, F—, Cl—, CH$_3$C(=O)CH=CHC(CH$_3$)O—, CH$_2$=CHC(=O)O—, CH$_2$=C(CH$_3$)C(=O)O—, CH$_2$CHC(=O)OCH$_2$CH$_2$C(=O)O—, CH$_2$=C(CH$_3$)C(=O)OCH$_2$CH$_2$C(=O)O—, and cyclopentadienyl; and
   (b) adding at least one color stabilizer selected from the group consisting of triphenyl phosphite, diphenyl-alkyl phosphites, phenyl-dialkyl phosphites, tris(nonylphenyl)phosphite, trilauryl phosphite, trioctadecyl phosphite, distearyl-pentaerythritol diphosphite, tris(2,4-di-tert-butylphenyl) phosphite, diisodecyl pentaerythritol diphosphite, bis(2,4-di-tert-butylphenyl)-pentaerythritol diphosphite, bis(2,4-di-cumylphenyl)-pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol diphosphite, bis(2,4-di-tert-butyl-6-methylphenyl)-methyl phosphite, bis(2,4-di-tert-butyl-6-methylphenyl)-ethyl phosphite, 2,2',2"-nitrilo[triethyltris(3,3',5,5'-tetra-tert-butyl-1,1'-biph-enyl-2, 2'-diyl)phosphite], 2-ethylhexyl(3,3',5,5'-tetra-tert-butyl-1,1'-biphenyl-2,2'-diyl)phosphite, trinonylphenol phosphite, phenyl diisodecyl phosphite, diphenyl isodecyl phosphite, diphenyl isooctyl phosphate, tetraphenyl dipropyleneglycol diphosphite, poly(dipropyleneglycol) phenyl phosphite, alkyl (C$_{12}$-C$_{15}$) bisphenol A phosphite, alkyl (C$_{10}$) bisphenol A phosphite, triisodecyl phosphite, tris (tridecyl) phosphite and tris (dipropylene glycol) phosphite to the silylated polymer composition prepared in step (a).

2. The process of claim 1 wherein hydroxyl-terminated polyurethane (iii) is obtained by reacting a molar excess of the hydroxyl equivalents of polyol (ii) with respect to the isocyanate equivalents of polyisocyanate (ix) in the presence of urethane-forming reaction catalyst (viii).

3. The process of claim 1 wherein isocyanate-terminated polyurethane (v) is obtained by reacting a molar excess of the isocyanate equivalents of polyisocyanate (ix) with respect to the hydroxyl equivalents of polyol (ii) in the presence of urethane-forming reaction catalyst (viii).

4. The process of claim 1 wherein polyol (ii) is at least one member selected from the group consisting of polyether polyols, polyester polyols and polybutadienediols.

5. The process of claim 2 wherein polyisocyanate (ix) is at least one member selected from the group consisting of 2,4-toluene diisocyanate, 2,6-toluene diisocyanate, 4,4'-diphenyl-methanediisocyanate, 2,4'-diphenyl-methanediisocyanate, isophorone diisocyanate, dicyclohexylmethane-4,4'-diisocyanate, hexamethylene diisocyanate, bis-(4-isocyanatocyclohexyl)methane and mixture of 2,4- and 4,4'-diphenylmethane-diisocyanates.

6. The process of claim 3 wherein polyisocyanate (ix) is at least one member selected from the group consisting of 2,4-toluene diisocyanate, 2,6-toluene diisocyanate, 4,4'-diphenyl-methanediisocyanate, 2,4'-diphenyl-methanediisocyanate, isophorone diisocyanate, dicyclohexylmethane-4,4'-diisocyanate, hexamethylene diisocyanate, bis-(4-isocyanatocyclohexyl)methane and mixture of 2,4- and 4,4'-diphenylmethane-diisocyanates.

7. The process of claim 1 wherein isocyanatosilane silylating agent (iv) is represented by general formula (I):

$$OCN-R^1-Si(R^2)_a(OR^3)_{3-a} \quad (I)$$

wherein
$R^1$ is an alkylene group containing from 1 to 12 carbon atoms;
$R^2$ is alkyl group containing from 1 to 8 carbon atoms;
$R^3$ is independently alkyl group containing from 1 to 6 carbon atoms; and
a is 0, 1 or 2.

8. The process claim 7 wherein isocyanatosilane silylating agent (iv) is at least one member selected from the group consisting of isocyanatomethyltrimethoxysilane, 3-isocyanatopropyltrimethoxysilane, isocyanatoisopropyltrimethoxysilane, 4-isocyanato-n-butyltrimethoxysilane, isocyanato-t-butyltrimethoxysilane, isocyanatomethylmethyldimethoxysilane, 3-isocyanatopropylmethyldimethoxysilane, isocyanatomethyltriethoxysilane, 3-isocyanatopropyltriethoxysilane, isocyanatomethylmethyldiethoxysilane, 3-isocyanatopropylmethyldiethoxysilane isocyanatoisopropyltriethoxysilane, 4-isocyanato-n-butyltriethoxysilane, isocyanato-t-butyltriethoxysilane.

9. The process of claim 1 wherein urethane-forming reaction catalyst (viii) is represented by general formula (II):

$$M^{(IV)}L_4 \quad (II)$$

wherein each M is titanium$^{(IV)}$ and L is a ligand selected from the group consisting of $R^4O-$, where $R^4$ is a hydrocarbon group of from 1 to 10 carbon atoms.

10. The process of claim 9 wherein urethane-forming reaction catalyst (viii) is at least one titanium-containing catalyst selected from the group consisting of tetraisopropyl titanate, tetrabutyl titanate, ethyl alcohol and isopropyl alcohol, and mixtures thereof.

11. The process of claim 1 wherein urethane-forming reaction catalyst (viii) is at least one zirconium-containing catalyst selected from the group consisting of zirconium(IV) tetra-ethoxide, and zirconium(IV) tetra-propoxide.

12. The process of claim 1 wherein amino-functional silane silylating agent (vi) and mercapto-functional silane silylating agent (vii) are represented by general formula (III):

$$X-R^6-Si(R^7)_b(OR^8)_{3-b} \quad (III)$$

wherein
X is an active hydrogen-containing group that is reactive for isocyanate, for example, $-SH-$, $-NHR^9$ in which $R^9$ is H, a linear, branched or cyclic hydrocarbon group of up to 8 carbon atoms, $-R^{10}-Si(R^{11})_c(OR^{12})_{3-c}$, $-CH[C(=O)OR^{11}]CH_2C(=O)OR^{11}$, $CH[C(=O)OR^{11}]CHR^7C(=O)OR^{11}$ or $-CH_2CH_2C(=O)OR^{11}$,
each $R^6$ and $R^{10}$ is independently divalent hydrocarbon group of up to 12 carbon atoms, optionally containing one or more heteroatoms,
each $R^7$ and $R^{11}$ is independently a monovalent hydrocarbon group containing up to 8 carbon atoms,
each $R^8$ and $R^{12}$ is independently an alkyl group containing from 1 to 6 carbon atoms, and
b and c each independently is 0, 1 or 2.

13. The process of claim 12 wherein amino-functional silane silylating agent (vi) is at least one member selected from the group consisting of N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-ethyl-3-amino-2,2-dimethylpropylmethyldimethoxysilane, N-ethyl-aminomethyltrimethoxysilane, N-ethyl-2-aminoethyltrimethoxysilane, N-ethyl-aminomethylmethyldimethoxysilane, N-butyl-3-aminopropyl trimethoxysilane, N-butyl-3-aminopropylmethydimethoxysilane, N-butyl-3-aminopropyl triethoxysilane, N-butyl-aminomethyltrimethoxysilane, N-butyl-2-aminoethylmethyldiethoxysilane, N-butyl-aminomethylmethydimethoxysilane, N-butyl-aminomethylmethydiethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethylbutyldimethoxymethylsilane, N-ethyl-4-amino-3,3-dimethylbutyltrimethoxy-silane, N-(cyclohexyl)-3-aminopropyltrimethoxysilane, N-(cyclohexyl)aminomethyltrimethoxysilane, N-(cyclohexyl)aminomethyltriethoxysilane, N-(cyclohexyl)aminomethyl methyldimethoxysilane, N-(cyclohexyl)aminomethyl methyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N,N-bis-(3-trimethoxysilyl-2-methylpropyl)amine, N,H-bis-(3-trimethoxysilylmethyl)amine, N,N-bis-(triethoxysilylmethyl)amine, N,N-bis-(methyldimethoxysilylmethyl)amine, N,N-bis-(3-methyldiethoxysilylmethyl)amine, N-phenyl-3-aminopropyltrimethoxysilane, N-phenyl-3-aminopropyltriethoxysilane and N-(3-trimethoxysilylpropyl)-3-amino-2-methylpropyltrimethoxysilane, N-(3-methyldiethoxysilypropyl)-2-hydroxy-1-propyl carbamate and N-(3-methyldiethoxysilypropyl)-hydroxy-2-propyl carbamate.

14. The process of claim 12 wherein mercapto-functional silane silylating agent (vii) is at least one member selected from the group consisting of 2-mercaptoethyl trimethoxysilane, 3-mercaptopropyl trimethoxysilane, 2-mercaptopropyl triethoxysilane, 3-mercaptopropyl triethoxysilane, 3-mercaptopropyl tri-t-butoxysilane, 3-mercaptopropyl triisopropoxysilane, 2-mercaptoethyl dimethoxy ethoxysilane, 3-mercaptopropyl dimethoxy methylsilane, 3-mercaptopropyl methoxy dimethylsilane, 3-mercaptopropyl diethoxy methylsilane, 4-mercaptobutyl trimethoxysilane, 3-mercaptocyclohexyl-trimethoxysilane, 12-mercaptododecyl trimethoxy silane, 12-mercaptododecyl triethoxy silane, 2-mercapto-2-methylethyl-tripropoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyl trimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane and 3-mercaptopropylphenyl triethoxysilane.

15. The process of claim 1 wherein urethane-forming reaction catalyst (viii) is employed in an amount of from 0.0003 to 0.01 part titanium or zirconium metal by weight based on 100 parts by weight of polyol (ii).

16. The silylated polyurethane polymer (i) of claim 15 containing urethane-forming reaction catalyst (viii) and being essentially tin-free.

17. An adhesive, sealant, composite, coating, or cosmetic product comprising the essentially tin-free silylated polyurethane polymer (i) of claim 16.

18. The cured silylated polyurethane polymer obtained from silylated polyurethane polymer (i) of claim 15 and being essentially tin-free.

\* \* \* \* \*